United States Patent
Kuno et al.

(10) Patent No.: US 11,110,436 B2
(45) Date of Patent: Sep. 7, 2021

(54) PHOSPHORUS COMPOUND-CONTAINING EXHAUST GAS PURIFYING CATALYST

(71) Applicant: UMICORE SHOKUBAI JAPAN CO., LTD., Tokoname (JP)

(72) Inventors: Hirotaka Kuno, Kobe (JP); Masashi Nakashima, Kobe (JP); Kimihiro Nakama, Kobe (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 0 days.

(21) Appl. No.: 16/767,213

(22) PCT Filed: Dec. 26, 2018

(86) PCT No.: PCT/JP2018/047942
§ 371 (c)(1),
(2) Date: May 27, 2020

(87) PCT Pub. No.: WO2019/131796
PCT Pub. Date: Jul. 4, 2019

(65) Prior Publication Data
US 2020/0384446 A1 Dec. 10, 2020

(30) Foreign Application Priority Data
Dec. 28, 2017 (JP) .............................. JP2017-254113

(51) Int. Cl.
| | | |
|---|---|---|
| *B01J 23/46* | (2006.01) | |
| *B01J 23/44* | (2006.01) | |
| *B01J 23/10* | (2006.01) | |
| *B01J 35/04* | (2006.01) | |
| *B01J 35/00* | (2006.01) | |
| *B01J 37/02* | (2006.01) | |
| *B01J 37/08* | (2006.01) | |
| *B01D 53/94* | (2006.01) | |
| *F01N 3/10* | (2006.01) | |

(52) U.S. Cl.
CPC .......... *B01J 23/464* (2013.01); *B01D 53/945* (2013.01); *B01J 23/10* (2013.01); *B01J 23/44* (2013.01); *B01J 35/0006* (2013.01); *B01J 35/04* (2013.01); *B01J 37/0228* (2013.01); *B01J 37/0236* (2013.01); *B01J 37/0244* (2013.01); *B01J 37/086* (2013.01); *F01N 3/101* (2013.01); *B01D 2255/1023* (2013.01); *B01D 2255/1025* (2013.01); *B01D 2255/2063* (2013.01); *B01D 2255/2065* (2013.01); *B01D 2255/2092* (2013.01); *B01D 2255/20715* (2013.01); *B01D 2255/904* (2013.01); *B01D 2255/905* (2013.01); *B01D 2255/9022* (2013.01); *B01D 2255/9202* (2013.01)

(58) Field of Classification Search
CPC ................ B01D 53/94; B01D 53/8671; B01D 2255/1023; B01D 2255/1025; B01D 2255/9022; B01D 2255/9025; B01D 2255/9032; B01D 2255/9035; B01D 2255/908; B01D 2257/55; B01D 2258/012; B01D 2258/0283; B01J 23/44; B01J 23/464; B01J 35/0006; B01J 37/0215; B01J 37/024; F01N 3/10; F01N 2570/08

See application file for complete search history.

(56) References Cited

U.S. PATENT DOCUMENTS

| | | | | |
|---|---|---|---|---|
| 5,102,634 A | * | 4/1992 | Hayashi ............. | B01D 53/8668 423/210 |
| 2007/0014705 A1 | | 1/2007 | Franklin | |
| 2014/0357480 A1 | | 12/2014 | Aoki | |
| 2017/0312690 A1 | | 11/2017 | Sato et al. | |
| 2018/0023444 A1 | | 1/2018 | Saito et al. | |
| 2020/0232362 A1 | * | 7/2020 | Liu ....................... | F01N 3/0828 |

FOREIGN PATENT DOCUMENTS

| | | |
|---|---|---|
| JP | H0838898 A | 2/1996 |
| JP | 2009501079 A | 1/2009 |
| JP | 2010005590 A | 1/2010 |
| JP | 2013136032 A | 7/2013 |
| JP | 2016140846 A | 8/2016 |

(Continued)

OTHER PUBLICATIONS

Culley et. al., The Impact of Passenger Car Motor Oil Phosphorus Levels on Automotive Emissions Control Systems, SAE Technical Paper Series, 961898, (1996).
International Search Report (PCT/ISA/210) dated Apr. 2, 2019, by the Japanese Patent Office as the International Searching Authority for International Application No. PCT/JP2018/047942.
Written Opinion (PCT/ISA/237) dated Apr. 2, 2019, by the Japanese Patent Office as the International Searching Authority for International Application No. PCT/JP2018/047942.

(Continued)

*Primary Examiner* — Timothy C Vanoy
(74) *Attorney, Agent, or Firm* — Buchanan Ingersoll & Rooney PC

(57) ABSTRACT

A phosphorus compound-containing exhaust gas purifying catalyst includes: a refractory three-dimensional structure extending from a gas inflow side end surface to a gas outflow side end surface, the refractory three-dimensional structure having cell walls that define and form multiple gas flow paths, the gas flow paths running from the gas inflow side end surface to the gas outflow side end surface; a lower catalyst layer that contains Pd and is formed continuously from the gas inflow side end surface on the cell walls; a gas inflow side upper catalyst layer that contains Rh and is located as an uppermost layer on the cell walls; and a gas outflow side upper catalyst layer that contains Rh and is located as an uppermost layer on the cell walls.

12 Claims, 8 Drawing Sheets

(56) References Cited

FOREIGN PATENT DOCUMENTS

JP          2017200676 A     11/2017
WO    WO 2010/01226 A1 *  1/2010   ......... B01J 37/0248

OTHER PUBLICATIONS

Office Action dated Nov. 10, 2020, by the Intellectual Property Office of India in corresponding Indian Patent Application No. 202047026706 and an English translation of the Action. (5 pages).

* cited by examiner

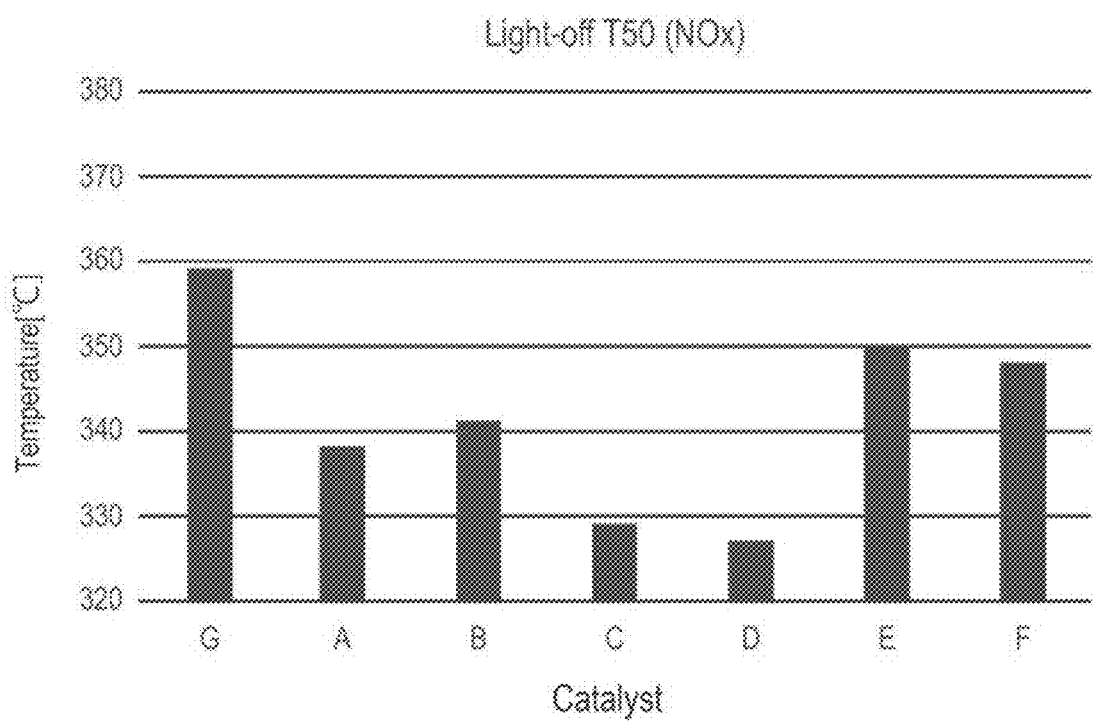

PHOSPHORUS COMPOUND-CONTAINING EXHAUST GAS PURIFYING CATALYST

TECHNICAL FIELD

The present invention relates to a catalyst suitable for purification of exhaust gas containing a phosphorus compound (also referred to simply as "phosphorus compound-containing exhaust gas"). More particularly, the present invention relates to a technology for improving exhaust gas purification performance in a catalyst after being exposed to the phosphorus compound-containing exhaust gas at high temperature over a long period of time.

RELATED ART

As regulations on automobile exhaust gas are tightened, maintaining exhaust gas purification performance over a long period of time has been demanded. This means that longer lifetime of a catalyst, that is, an improvement in long-term durability of the catalyst as a post-treatment device for exhaust gas purification has been demanded.

Poisoning caused by a phosphorus compound contained in the exhaust gas (also referred to simply as "phosphorus poisoning") has been known to greatly reduce exhaust gas purification performance. The phosphorus poisoning occurs when a phosphorus compound derived from a lubricant additive, such as zinc dialkyldithiophosphate, contained in exhaust gas is deposited and infiltrated into a catalyst layer (Non-patent Literature 1).

It has been known that the reduction in exhaust gas purification performance by phosphorus poisoning is caused by the following phenomena. The phosphorus compound deposited on and infiltrated into the catalyst layer inhibits the diffusion of the exhaust gas in the catalyst layer. In addition, cerium phosphate is formed through reaction of ceria ($CeO_2$ (cerium oxide)), an oxygen storage material (oxygen storage/release material) widely used in a three-way catalyst, with the phosphorus compound. The formation of cerium phosphate decreases oxygen storage/release capacity, and therefore mitigation when the exhaust gas atmosphere varies between lean and rich is less likely to occur. Due to these phenomena, the exhaust gas purification rate decreases.

As technologies for suppressing the reduction in exhaust gas purification performance due to phosphorus poisoning, there have been disclosed a technology that uses a composite oxide of ceria and zirconia ($ZrO_2$ (zirconium oxide)) as an oxygen storage/release material in a catalyst using palladium (Pd) (Patent Literature 1); a technology that provides a region where a catalyst layer is not applied as a phosphorus capture zone at a front end of a catalyst structure (Patent Literature 2); and a technology that configures a length of an upper catalyst layer to be shorter than a length of a lower catalyst layer in a gas flow direction in a catalyst including the upper catalyst layer supporting rhodium (Rh) and the lower catalyst layer supporting Pd or/and platinum (Pt) (Patent Literature 3).

RELATED ART LITERATURE

Patent Literature

[Patent Literature 1] JP-A H8-38898
[Patent Literature 2] JP 2009-501079 T (equivalent to US 2007/014,705 A)
[Patent Literature 3] JP-A 2010-5590 (equivalent to WO 2010/001226)

Non-Patent Literature

[Non-patent literature 1] A. Scott et. al., SAE Paper, 961898, (1996)

SUMMARY OF THE INVENTION

Problem to be Solved by the Invention

In recent years, the demand for a longer catalyst lifetime has become even stronger, and a catalyst that can exhibit sufficient exhaust gas purification performance even after being exposed to phosphorus compound-containing exhaust gas at high temperature over a long period of time has been demanded.

However, according to investigations by the present inventors, it has been found that the catalysts disclosed in Patent Literatures 1 to 3 cannot obtain sufficient exhaust gas purification performance after severe aging treatment by phosphorus poisoning at high temperature.

Therefore, an object of the present invention is to provide a catalyst that can exhibit sufficient exhaust gas purification performance even after being exposed to phosphorus compound-containing exhaust gas at high temperature over a long period of time.

Means for Solving the Problem

The present inventors have conducted a diligent research into solving the problems described above. As a result, at least three catalyst layers, a lower catalyst layer, a gas inflow side upper catalyst layer, and a gas outflow side lower catalyst layer, are disposed on the cell walls of a refractory three-dimensional structure, and a region where the lower catalyst layer is not formed and a region where the upper catalyst layer (the gas inflow side upper catalyst layer or the gas outflow side upper catalyst layer) is not formed are each provided along an exhaust gas flow direction in a predetermined range. The present inventors have found that this solves the problems and have completed the present invention.

That is, a phosphorus compound-containing exhaust gas purifying catalyst according to one aspect of the present invention includes a refractory three-dimensional structure, a lower catalyst layer, a gas inflow side upper catalyst layer, and a gas outflow side upper catalyst layer. The refractory three-dimensional structure is provided extending from a gas inflow side end surface to a gas outflow side end surface. The refractory three-dimensional structure has a cell walls which define and form multiple gas flow paths. These multiple gas flow paths run from the gas inflow side end surface to the gas outflow side end surface. The lower catalyst layer contains Pd and is formed continuously from the gas inflow side end surface on the cell walls. The gas inflow side upper catalyst layer contains Rh and is located on the uppermost layer on the cell walls. The gas inflow side upper catalyst layer is formed continuously from the gas inflow side end surface. The gas outflow side upper catalyst layer contains Rh and is located on the uppermost layer on the cell walls. The gas outflow side upper catalyst layer is formed continuously from the gas outflow side end surface. The gas inflow side upper catalyst layer and the gas outflow side upper catalyst layer are disposed so as to be separated from one another along the gas flow path direction. The lower catalyst layer has a length along the gas flow path direction of 15 mm or more. The length ratio is 18% or greater and less than 100% of the total length of the gas flow paths.

BRIEF DESCRIPTION OF THE DRAWINGS

FIG. 7C is a graph illustrating temperatures at which NOx purification rates of the catalysts according to the examples and the comparative examples of the present invention reach 50%.

BEST MODE FOR CARRYING OUT THE INVENTION

While embodiments of the present invention will be described below, the technical scope of the present invention should be defined based on the description of the claims and is not limited to the following embodiments. Note that numerical ranges "A to B" in the present specification mean "A or greater and B or less." Also, "A and/or B" mean "either one of A and B" or "both A and B." Furthermore, various physical properties in the present specification mean values measured by methods described in examples described later, unless otherwise specified.

Phosphorus Compound-Containing Exhaust Gas Purifying Catalyst

The phosphorus compound-containing exhaust gas purifying catalyst according to one aspect of the present invention (hereinafter, also simply referred to as "catalyst") includes a refractory three-dimensional structure, a lower catalyst layer, a gas inflow side upper catalyst layer and a gas outflow side upper catalyst layer. The refractory three-dimensional structure is provided extending from a gas inflow side end surface to a gas outflow side end surface. The refractory three-dimensional structure has cell walls that define and form multiple gas flow paths. The multitude of gas flow paths run from the gas inflow side end surface to the gas outflow side end surface. The lower catalyst layer contains Pd and is formed continuously from the gas inflow side end surface on the cell walls. The gas inflow side upper catalyst layer contains Rh and is located on the uppermost layer on the cell walls. The gas inflow side upper catalyst layer is formed continuously from the gas inflow side end surface. The gas outflow side upper catalyst layer contains Rh and is located on the uppermost layer on the cell walls. The gas outflow side upper catalyst layer is formed continuously from the gas outflow side end surface. The gas inflow side upper catalyst layer and the gas outflow side upper catalyst layer are disposed so as to be separated from one another along the gas flow path direction. The lower catalyst layer has a length along the gas flow path direction of 15 mm or greater, and 18% or greater and less than 100% of the total length of the gas flow paths. The catalyst according to the present embodiment having this structure can exhibit sufficient exhaust gas purification performance even after being exposed to phosphorus compound-containing exhaust gas at high temperature over a long period of time.

The following describes an overall structure of the phosphorus compound-containing exhaust gas purifying catalyst according to the first embodiment, and then describes each component afterwards.

First Embodiment

Figure 1:
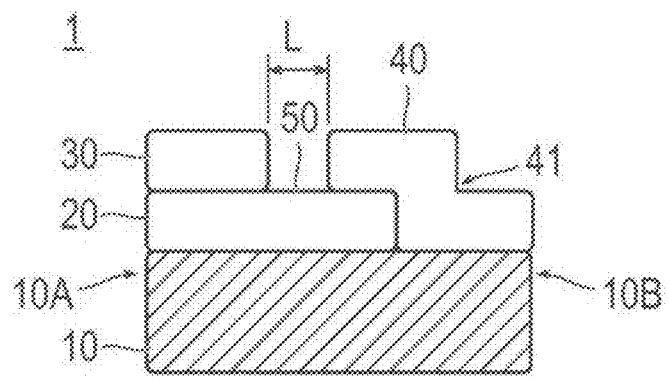
FIG. 1 is a cross-sectional view illustrating a phosphorus compound-containing exhaust gas purifying catalyst according to a first embodiment of the present invention.

The first embodiment of the present invention will be described with reference to the drawings. FIG. 1 is a cross-sectional view illustrating a phosphorus compound-containing exhaust gas purifying catalyst 1 according to the first embodiment. A specific example of the first embodiment includes a catalyst C of Example 3 described later.

The phosphorus compound-containing exhaust gas purifying catalyst 1 according to the first embodiment includes a refractory three-dimensional structure 10, a lower catalyst layer 20, a gas inflow side upper catalyst layer 30, and a gas outflow side upper catalyst layer 40.

As illustrated in FIG. 1, the refractory three-dimensional structure 10 is provided extending from a gas inflow side end surface 10A to a gas outflow side end surface 10B. In addition, the refractory three-dimensional structure 10 has a cell walls that define and form multiple gas flow paths running from the gas inflow side end surface 10A to the gas outflow side end surface 10B. Note that, in FIG. 1, the refractory three-dimensional structure has a length in the gas flow path direction of 80 mm.

The lower catalyst layer 20 is formed on the cell wall continuously from the gas inflow side end surface 10A. The lower catalyst layer 20 has a length along the gas flow path direction (left-right direction in FIG. 1) of 50 mm and 62.5% of the total length of the gas flow path. That is, the lower catalyst layer 20 is formed from the gas inflow side end surface 10A up to the middle of the surface of the refractory three-dimensional structure 10.

The gas inflow side upper catalyst layer 30 is located on the uppermost layer on the cell wall, formed continuously from the gas inflow side end surface 10A, and is provided on the upper surface of the lower catalyst layer 20. The gas inflow side upper catalyst layer 30 has a length along the gas flow path direction of 30 mm, and the length ratio is 37.5% of the total length of the gas flow paths.

The gas outflow side upper catalyst layer 40 is located on an uppermost layer on the cell wall and formed continuously from the gas outflow side end surface 10B. As illustrated in FIG. 1, the portion on the left side of the gas outflow side upper catalyst layer 40 is formed on the surface of the lower catalyst layer 20, and the portion on the right side is formed on the surface of the refractory three-dimensional structure 10. In other words, the gas outflow side upper catalyst layer 40 is formed in a stepped shape such that the total thickness of the catalyst layers at a gas inflow side end of the gas outflow side upper catalyst layer 40 is greater than the total thickness of the catalyst layers at a gas outflow side end of the gas outflow side upper catalyst layer 40. As a result, a step portion 41 is formed on the gas outflow side of the gas outflow side upper catalyst layer 40, and a surface area of the gas outflow side upper catalyst layer 40 increases. Furthermore, since a wall is not formed on the gas outflow side, the step portion 41 on the gas outflow side is less likely to be poisoned with phosphorus. The gas outflow side upper catalyst layer surface where a catalytic activity is maintained is largely present, and exhaust gas purification performance can be further improved. Note that, in FIG. 1, while the gas outflow side upper catalyst layer is formed in the stepped shape, the gas outflow side upper catalyst layer may be formed such that the total thickness of the catalyst layers gradually decreases from the gas inflow side end to the gas outflow side end of the gas outflow side upper catalyst layer. Therefore, the phosphorus compound-containing exhaust gas purifying catalyst according to a preferred embodiment of the present invention is characterized in that the total thickness of the catalyst layers at the gas inflow side end of the gas outflow side upper catalyst layer is greater than the total thickness of the catalyst layers at the gas outflow side end of the gas outflow side upper catalyst layer.

The gas outflow side upper catalyst layer 40 has a length along the gas flow path direction of 40 mm, and the length ratio is 50% to the total length of the gas flow paths.

As illustrated in FIG. 1, the gas inflow side upper catalyst layer 30 and the gas outflow side upper catalyst layer 40 are disposed so as to be separated from one another along the gas flow path direction. The separation distance L between the gas inflow side upper catalyst layer 30 and the gas outflow side upper catalyst layer 40 is 10 mm.

In the embodiment illustrated in FIG. 1, the gas inflow side upper catalyst layer 30 and the gas outflow side upper catalyst layer 40 are disposed to be separated to form a recessed portion 50 between the gas inflow side upper catalyst layer 30 and the gas outflow side upper catalyst layer 40. By forming the recessed portion 50 in this manner, a phosphorus compound collides with a wall on the gas outflow side of the recessed portion 50 and deposits on the recessed portion 50, and thus poisoning of the gas outflow side upper catalyst layer 40 with the phosphorus compound can be suppressed. As a result, the catalyst activity is maintained even after the gas outflow side upper catalyst layer 40 is exposed to the phosphorus compound-containing exhaust gas over a long period of time, and therefore the exhaust gas purification performance of the whole catalyst can be improved compared to a case where such a recessed portion is not provided. Therefore, the catalyst according to the present embodiment can be suitably used to purify exhaust gas containing a phosphorus compound in exhaust gas of an internal combustion engine, and exhibits excellent effects on purification of nitrogen oxides, carbon monoxide, and hydrocarbons contained in the exhaust gas from the internal combustion engine, preferably a gasoline engine.

Second Embodiment

Figure 2:
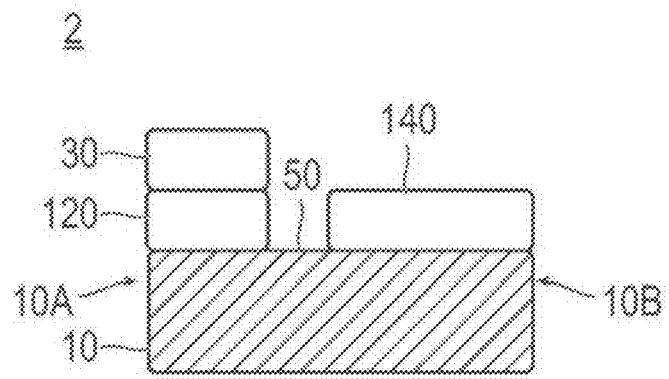
FIG. 2 is a cross-sectional view illustrating a phosphorus compound-containing exhaust gas purifying catalyst according to a second embodiment of the present invention.

Next, a structure of a phosphorus compound-containing exhaust gas purifying catalyst 2 according to the second embodiment of the present invention will be described with reference to FIG. 2. FIG. 2 is a cross-sectional view illustrating the phosphorus compound-containing exhaust gas purifying catalyst 2 according to the second embodiment. A specific example of the second embodiment includes a catalyst A of Example 1 described later. Descriptions of parts common to those of the first embodiment will be omitted, and only characteristic parts of the second embodiment will be described. Note that parts identical to those of the first embodiment described above are described with the same reference number, and overlapping descriptions will be omitted. The second embodiment differs from the first embodiment in the structure of the lower catalyst layer and the gas outflow side upper catalyst layer.

As illustrated in FIG. 2, the phosphorus compound-containing exhaust gas purifying catalyst 2 according to the second embodiment includes the refractory three-dimensional structure 10, a lower catalyst layer 120, the gas inflow side upper catalyst layer 30, and a gas outflow side upper catalyst layer 140.

The lower catalyst layer 120 has a length along the gas flow path direction of 30 mm and is disposed so that the length along the gas flow path direction is shorter than that of the lower catalyst layer 20 according to the first embodiment.

As illustrated in FIG. 2, the gas outflow side upper catalyst layer 140 is disposed on the surface of the refractory three-dimensional structure 10 so as to be separated from the lower catalyst layer 120. At this time, since the gas inflow side upper catalyst layer 30 has a length along the gas flow path direction of 30 mm, which is same as the length along the gas flow path direction as that of the lower catalyst layer 120, the gas outflow side upper catalyst layer 140 is disposed so as to be separated from the lower catalyst layer 120 by 10 mm.

Figure 3:
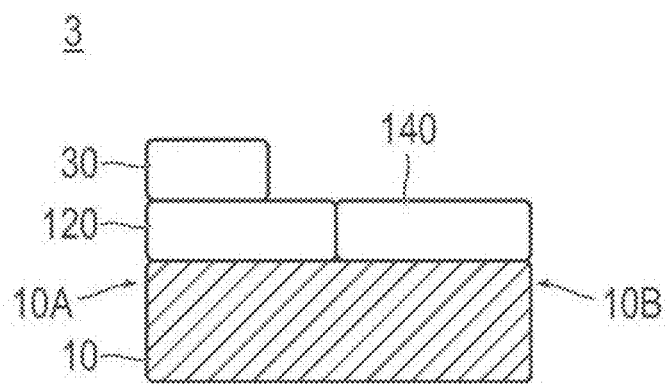
FIG. 3 is a cross-sectional view illustrating a modified example of the phosphorus compound-containing exhaust gas purifying catalyst according to the second embodiment of the present invention.

Note that, as illustrated in FIG. 3, the gas outflow side upper catalyst layer 140 may be disposed so as to contact the right end of the lower catalyst layer 120. At this time, the length along the gas flow path direction of the gas inflow side upper catalyst layer 30 is shorter than the length along the gas flow path direction of the lower catalyst layer 120, and thus the gas outflow side upper catalyst layer 140 is disposed so as to be separated from the gas inflow side upper catalyst layer 30. A specific example of the catalyst illustrated in FIG. 3 includes a catalyst B of Example 2 described later.

As described in the first embodiment and the second embodiment, the phosphorus compound-containing exhaust gas purifying catalyst according to the present embodiment features that (i) the gas inflow side upper catalyst layer and the gas outflow side upper catalyst layer are disposed so as to be separated from one another along the gas flow path direction; and (ii) the lower catalyst layer has the length along the gas flow path direction of 15 mm or more. The length ratio is 18% or more and less than 100% of the total length of the gas flow paths.

In the feature (i), the length of the separation distance between the gas inflow side upper catalyst layer and the gas outflow side upper catalyst layer is greater than 0 mm, preferably 5 mm or greater, more preferably 8 mm or greater, and further preferably 10 mm or greater; preferably 30 mm or less, more preferably 20 mm or less, and further preferably 15 mm or less. A numerical range of the length of the separation distance is preferably 5 mm or greater and 30 mm or less, more preferably 8 or greater mm and 20 mm or less, and further preferably 10 mm or greater and 15 mm or less. When the length of the separation distance is 0 mm, that is, when the gas inflow side upper catalyst layer and the gas outflow side upper catalyst layer are not separated, it is possible that exhaust gas cannot be efficiently purified after phosphorus poisoning. On the other hand, the separation distance of 30 mm or less is preferred from the perspective that a gas outflow side upper catalyst layer can be produced with sufficient length to purify the exhaust gas and that phosphorus poisoning can be reduced. Note that the length along the gas flow path direction of the gas inflow side upper catalyst layer is preferably equal to or less than the length of the lower catalyst layer. Although the reason is unclear, the separation distance is preferably the length described above, regardless of the length of the refractory three-dimensional structure.

In the feature (ii), the length along the gas flow path direction of the lower catalyst layer is 15 mm or greater, preferably 20 mm or greater, more preferably 30 mm or greater, and preferably less than 100 mm. In addition, the length ratio of the total length of the gas flow paths is 18% or greater, preferably 25% or greater, and more preferably 37% or greater; and is less than 100%, preferably 88% or less, and more preferably 75% or less. A numerical range of the length ratio is, 18% or more and less than 100%, preferably 25% or more and 88% or less, and more preferably 37% or more and 75% or less. The length ratio of the lower catalyst layer of less than 18% is not preferred from the perspective that the exhaust gas cannot be efficiently purified at a high space velocity. On the other hand, when the length ratio of the lower catalyst layer is 100%, the number of points where the thickness of the catalyst layers changes from the gas inflow side end surface to the gas outflow side end surface is small, and therefore turbulence and compression are less likely to occur. When turbulence and compression are less likely to occur, the exhaust gas becomes less likely to diffuse into the catalyst layer, and therefore the sufficient exhaust gas purification performance may not be exhibited, which is not preferred.

The length of the gas inflow side upper catalyst layer along the gas flow path direction is preferably 10 mm or greater, more preferably 15 mm or greater, further preferably 20 mm or greater, and particularly preferably 25 mm or greater; preferably 40 mm or less, more preferably 35 mm or less, and further preferably 30 mm or less. A numerical range of the length is preferably 10 mm or greater and 40 mm or less, more preferably 15 mm or greater and 35 mm or less, further preferably 20 mm or greater and 30 mm or less, and particularly preferably 25 mm or greater and 30 mm or less. The length of the gas inflow side upper catalyst layer of 10 mm or greater is preferred from the perspective that NOx can be efficiently purified even at low temperatures (150° C. to 600° C.) and at high space velocity. On the other hand, the length of the gas inflow side upper catalyst layer of 40 mm or less is preferred from the perspective that a large amount of Rh, which is expensive, is not required. Furthermore, the length ratio to the total length of the gas flow paths is preferably 12% or greater, more preferably 18% or greater, further preferably 25% or greater, and particularly preferably 31% or greater; preferably 57% or less, more preferably 50% or less, further preferably 44% or less, and particularly preferably 38% or less. A numerical range of the length ratio is preferably 12% or more and 57% or less, more preferably 18% or greater and 50% or less, further preferably 25% or greater and 44% or less, and particularly preferably 31% or more and 38% or less.

The length along the gas flow path direction of the gas outflow side upper catalyst layer is preferably 25 mm or greater, more preferably 30 mm or greater, further preferably 40 mm or greater, and preferably less than 100 mm. In addition, regarding the length along the gas flow path direction of the gas outflow side upper catalyst layer, the length ratio to the total length of the gas flow paths is preferably 31% or greater, more preferably 43% or greater, further preferably 50% or greater; and preferably less than 88% and further preferably 75% or less. The numerical range of the length ratio is preferably 31 or more and less than 88%, more preferably 43% or more and 75% or less, and further preferably 50% or greater and 75% or less. When the length ratio of the gas outflow side upper catalyst layer is 31% or greater, the exhaust gas purification performance at low temperatures after phosphorus poisoning is less likely to be reduced. On the other hand, the length ratio of the gas outflow side upper catalyst layer of less than 88% allows sufficient length of and separation distance from the gas inflow side upper catalyst layer.

Note that the length along the gas flow path direction of the gas outflow side upper catalyst layer is a length obtained by subtracting the length of the gas inflow side upper catalyst layer and the length of the separation distance from the total length of the gas flow paths (the length of the refractory three-dimensional structure).

The separation distance and the length of each catalyst layer described above are obtained by observing a cross section of the catalyst cut off in the gas flow direction. In measuring the predetermined position, length, and thickness, the catalyst is broken, and a microscope, such as a caliper and a microscope, can be used. Moreover, an X-ray CT device can be used to measure the length without breaking the catalyst. As long as the method can measure the length, any method is usable regardless of being destructive or non-destructive.

Note that while only the lower catalyst layer, the gas inflow side upper catalyst layer, and the gas outflow side upper catalyst layer are indispensable in the present invention as the catalyst layers described above, the catalyst according to the present embodiment may include catalyst layers other than these. For example, another catalyst layer may be included between the refractory three-dimensional structure and the lower catalyst layer, or another catalyst layer may be included between the lower catalyst layer and the gas inflow side upper catalyst layer or between the lower catalyst layer and the gas outflow side upper catalyst layer. However, considering simplification of a catalyst manufacturing process, it is preferred that the catalyst according to the present embodiment only includes the lower catalyst layer, the gas inflow side upper catalyst layer, and the gas outflow side upper catalyst layer as the catalyst layers.

Next, each component included in the phosphorus compound-containing exhaust gas purifying catalyst according to the present embodiment will be described.

Refractory Three-Dimensional Structure

The refractory three-dimensional structure is not particularly limited, and generally one used in a field of exhaust gas purifying catalyst can be employed as appropriate. The refractory three-dimensional structure is preferably a honeycomb carrier. Examples of the honeycomb carrier include a monolithic honeycomb carrier, a metal honeycomb carrier, a plug honeycomb carrier, such as a particulate filter. As examples of the materials, cordierite, silicon carbide, silicon nitride, stainless steel, and heat-resistant metal, such as a Fe—Cr—Al alloy, can be used.

These honeycomb carriers are manufactured by, for example, extrusion molding method and a method of winding and fixing a sheet-like element. Shapes of their gas passages (cell shapes) may be any of a hexagon, a quadrilateral, a triangle, or a corrugation shape. A cell density (cell count/unit cross-sectional area) of 100 to 1200 cells per square inch (15.5 to 186 cells per square centimeter) is sufficiently usable, and the cell density is preferably 200 to 900 cells per square inch (31 to 139.5 cells per square centimeter).

The refractory three-dimensional structure preferably has the length along the gas flow path direction of greater than 15 mm, more preferably 30 mm or greater, further preferably 40 mm or greater, particularly preferably 58 mm, and most preferably 78 mm or greater; preferably 1000 mm or less, more preferably 300 mm or less, further preferably 200 mm or less, even more preferably 100 mm or less, particularly preferably 90 mm or less, and most preferably 85 mm or less. The length range is preferably greater than 15 mm and 1000 mm or less, more preferably 30 mm or more and 300 mm or less, further preferably 40 mm or more and 200 mm or less, even more preferably 58 mm or more and 100 mm or less, particularly preferably 78 mm or greater and 90 mm or less, and most preferably 78 mm or greater and 85 mm or less.

Catalyst Layer

The lower catalyst layer, the gas inflow side upper catalyst layer, and the gas outflow side upper catalyst layer each independently contain a catalyst component, such as a noble metal, an oxygen storage material, a refractory inorganic oxide, and/or a co-catalyst.

Noble Metal

Although the noble metal only needs to be one used for exhaust gas purifying catalyst, the noble metal is preferably selected from rhodium (Rh), palladium (Pd), and platinum (Pt). In each catalyst layer, only one kind of noble metal may be used alone, or two or more kinds of noble metals may be used in combination. The same noble metal may be used for each catalyst layer, or multiple noble metals may be used in combination as the whole catalyst by the use of different noble metals.

In the catalyst of the present embodiment, the lower catalyst layer contains Pd and the gas inflow side upper catalyst layer and the gas outflow side upper catalyst layer contain Rh. However, obviously, the lower catalyst layer may contain a noble metal other than Pd, and the gas inflow side upper catalyst layer and the gas outflow side upper catalyst layer may contain a noble metal other than Rh. The noble metal other than Pd that may be contained in the lower catalyst layer is preferably Rh and/or Pt, either one of Rh and Pt is more preferred, and Pt is preferred. On the other hand, the noble metal other than Rh that may be contained in the gas inflow side upper catalyst layer or the gas outflow side upper catalyst layer is each independently preferably either one of Pd and Pt, and Pd is preferred.

The Rh concentration of the gas inflow side upper catalyst layer is preferably higher than the Rh concentration of the gas outflow side upper catalyst layer. Specifically, the ratio of the Rh concentration of the gas inflow side upper catalyst layer to the Rh concentration of the gas outflow side upper catalyst layer is preferably 1.1 to 5 times, more preferably 1.1 to 4 times, further preferably 1.1 to 2 times, and particularly preferably 1.1 to 1.35 times. Here, the Rh concentration in each layer is based on a percentage found by dividing the mass of Rh contained in the layer by the amount of material supported in the layer (a total mass of solid content contained in the layer). The ratio of 1.1 times or greater provides sufficient warm-up performance and therefore is preferred, and the ratio of five times or less suppresses the decrease in exhaust gas purification performance due to phosphorus poisoning and is, therefore, preferred.

When the gas inflow side upper catalyst layer contains Pd, the mass ratio of Pd to Rh in the gas inflow side upper catalyst layer (Pd/Rh) is preferably from 0.05 to 5.0, more preferably from 0.1 to 2.0, and further preferably from 0.3 to 0.8. The Pd/Rh of 0.05 or greater is preferred because the Rh is less likely to be poisoned by phosphorus because of the Pd in the gas inflow side catalyst layer. On the other hand, the Pd/Rh of 5.0 or less suppresses a reduced reactivity of Rh when Rh is covered with Pd and therefore is preferable.

Additionally, the Rh concentration of the lower catalyst layer is preferably lower than the Rh concentration of the gas outflow side upper catalyst layer. Specifically, the ratio of the Rh concentration of the lower catalyst layer to the Rh concentration of the gas outflow side upper catalyst layer is preferably from 0 to 0.5 times, more preferably from 0 to 0.3 times, and further preferably from 0 to 0.1 times. Although the presence of Rh in the lower catalyst layer is not necessarily required, the ratio of 0.5 times or less does not greatly impair the performance of the lower catalyst layer and therefore is preferable.

For Rh, the amount of noble metal contained in the catalyst according to the present embodiment is preferably from 0.01 to 10 g, more preferably from 0.05 to 8 g, and further preferably from 0.1 to 5 g per liter of the refractory three-dimensional structure. For Pd, the amount of noble metal is preferably from 0.05 to 20 g, more preferably from 0.5 to 15 g, and further preferably from 1 to 10 g per liter of the refractory three-dimensional structure. For Pt, the amount of noble metal is preferably from 0.01 to 15 g, more preferably from 0.1 to 10 g, and further preferably from 0.5 to 5 g per liter of the refractory three-dimensional structure.

A rhodium (Rh) source as a starting raw material is not particularly limited, and a raw material used in the field of purification of exhaust gas can be used. Specific examples include rhodium; a halide, such as rhodium chloride; inorganic salts, such as nitrate, sulfate, acetate, ammonium salt, amine salt, hexaammine salt, a carbonate, bicarbonate, nitrite, and oxalate of rhodium; carboxylic acid salt, such as formate salt; and hydroxide, alkoxide, and an oxide. The examples preferably include nitrate, ammonium salt, amine salt, and a carbonate. Here, the amount of rhodium source added depends on the amount of rhodium that should be supported on the three dimensional structure as described above. Note that, in the present invention, the rhodium source may be a single source or a mixture of two or more kinds.

Furthermore, a palladium (Pd) source as the starting raw material is not particularly limited, and a raw material used in the field of purification of exhaust gas can be used. Specific examples include palladium; a halide, such as palladium chloride; inorganic salts, such as nitrate, sulfate, acetate, ammonium salt, amine salt, tetraammine salt, a carbonate, bicarbonate, nitrite, and oxalate of palladium; carboxylic acid salt, such as formate salt; and hydroxide, alkoxide, and an oxide. The examples preferably include nitrate, acetate, ammonium salt, amine salt, tetraammine salt, and a carbonate. Here, the amount of palladium source added depends on the amount of palladium that should be supported on the three dimensional structure as described above. Note that, in the present invention, the palladium source may be a single source or a mixture of two or more kinds.

In addition, a platinum (Pt) source as a starting raw material when the platinum is contained as a catalyst active component is not particularly limited, and raw materials used in the field of purification of exhaust gas can be used. Specific examples include: platinum; a halide, such as a platinum bromide and platinum chloride; inorganic salts, such as nitrate, dinitrodiammine salt, tetraammine salt, sulfate, ammonium salt, amine salt, bis-ethanolamine salt, bis-acetylacetonate salt, a carbonate, bicarbonate, nitrite, and oxalate of platinum; carboxylic acid salt, such as formate salt; and hydroxide, alkoxide, and an oxide. Among these, nitrate (platinum nitrate), dinitrodiammine salt (dinitrodiammine platinum), chloride (platinum chloride), tetraammine salt (tetraammineplatinum), bis-ethanolamine salt (bis-ethanolamine platinum), and bis(acetylacetonate) salt (bis(acetylacetonato) platinum) are preferred. Here, the amount of platinum source added depends on the amount of platinum that should be supported on the three dimensional structure as described above. Note that, in the present invention, the platinum source may be a single source or a mixture of two or more kinds.

Oxygen Storage Material

The oxygen storage material is a material that can store or release oxygen according to the oxygen concentration in the exhaust gas. Examples of the oxygen storage material include cerium oxide, an oxide containing cerium and another element, such as cerium-zirconium composite oxide, cerium-zirconium-lanthanum composite oxide, cerium-zirconium-lanthanum-neodymium composite oxide, and cerium-zirconium-lanthanum-yttrium composite oxide.

The oxygen storage material has a crystal structure of, for example, a cubic crystal, a tetragonal crystal, a monoclinic crystal, and an orthorhombic crystal, preferably has a structure of a cubic crystal, a tetragonal crystal, and a monoclinic crystal, and more preferably a structure of a cubic crystal and a tetragonal crystal.

A cerium source, such as the cerium-zirconium composite oxide, used as the oxygen storage material is not particularly limited, and the raw materials used in the field of purification of exhaust gas can be used. Specific examples include nitrate, such as cerous nitrate, a carbonate, and sulfate. Among these, nitrate is preferably used. Note that the cerium source may be a single source or a mixture of two or more kinds. The amount of the cerium source added is preferably from 5 to 200 g, more preferably from 10 to 100 g, further preferably from 15 to 70 g, and particularly preferably from 20 to 50 g per liter of the refractory three-dimensional structure in terms of cerium oxide ($CeO_2$).

A zirconium source is not particularly limited, and the raw materials used in the field of purification of exhaust gas can be used. Specific examples include zirconium oxynitrate, zirconium oxychloride, zirconium nitrate, and basic zirconium sulfate. Among these, zirconium oxynitrate and zirconium nitrate are preferably used. Note that the zirconium source may be a single source or a mixture of two or more kinds. The amount of the zirconium source added is preferably from 5 to 200 g, more preferably from 10 to 150 g, and further preferably from 20 to 100 g per liter of the refractory three-dimensional structure in terms of zirconium oxide ($ZrO_2$).

A lanthanum source is not particularly limited, and the raw materials used in the field of purification of the exhaust gas can be used. Specific examples include lanthanum hydroxide, lanthanum nitrate, lanthanum acetate, and lanthanum oxide. Among these, lanthanum nitrate and lanthanum hydroxide are preferably used. The lanthanum source may be a single source or may be a mixture of two or more kinds. The amount of the lanthanum source added is preferably from 1 to 50 g, more preferably from 1 to 35 g, and further preferably from 1 to 20 g per liter of the refractory three-dimensional structure in terms of lanthanum oxide ($La_2O_3$).

An yttrium source is not particularly limited, and the raw materials used in the field of purification of exhaust gas can be used. Specific examples include yttrium hydroxide, yttrium nitrate, yttrium oxalate, and yttrium sulfate. Among these, yttrium hydroxide and yttrium nitrate are preferably used. Note that the yttrium source may be a single source or a mixture of two or more kinds. The amount of the yttrium source added is preferably from 0 to 50 g, more preferably from 0 to 35 g, and further preferably from 0 to 20 g per liter of the refractory three-dimensional structure in terms of yttrium oxide ($Y_2O_3$).

A neodymium source is not particularly limited, and the raw materials used in the field of purification of exhaust gas can be used. Specific examples include neodymium hydroxide, neodymium nitrate, neodymium oxalate, and neodymium sulfate. Among these, neodymium hydroxide and neodymium nitrate are preferably used. Note that the neodymium source may be a single source or a mixture of two or more kinds. The amount of the neodymium source added is preferably from 0 to 50 g, more preferably from 0 to 35 g, and further preferably from 0 to 20 g per liter of the refractory three-dimensional structure in terms of neodymium oxide ($Nd_2O_5$).

In the catalyst of the present embodiment, preferably at least one layer among the lower catalyst layer, the gas inflow side upper catalyst layer, and the gas outflow side upper catalyst layer contains a composite oxide containing $CeO_2$ and $ZrO_2$, more preferably at least two layers contain the composite oxide containing $CeO_2$ and $ZrO_2$, and further preferably all three layers contain the composite oxide containing $CeO_2$ and $ZrO_2$.

When the lower catalyst layer contains the composite oxide containing $CeO_2$ and $ZrO_2$, the concentration of $CeO_2$ in the composite oxide is preferably 20 mass % or greater, more preferably 30 mass % or greater, further preferably 40 mass % or greater, and particularly preferably 45 mass % or greater; preferably 80 mass % or less, more preferably 60 mass % or less, further preferably 50 mass % or less, and particularly preferably 45 mass % or less. A numerical range of the concentration of the $CeO_2$ is preferably 20 mass % or greater and 80 mass % or less, more preferably 30 mass % or greater and 60 mass % or less, further preferably 40 mass % or greater and 50 mass % or less, and particularly preferably 45 mass % or greater and 50 mass % or less or 40 mass % or greater and 45 mass % or less. When the concentration of $CeO_2$ is 20 mass % or greater, sufficient oxygen storage capacity is exhibited even during high speed traveling and when subjected to phosphorus poisoning, so hydrocarbons can be efficiently purified. On the other hand, when the concentration of $CeO_2$ is 80 mass % or less, heat resistance is less likely to decrease, so the catalyst performance can be maintained even when the catalyst is exposed to high-temperature exhaust gas.

When the gas inflow side upper catalyst layer and/or the gas outflow side upper catalyst layer contain the composite oxide containing $CeO_2$ and $ZrO_2$, the concentration of $CeO_2$ in the composite oxide is preferably 5 mass % or greater, more preferably 10 mass %, further preferably 15 mass % or greater, and particularly preferably 20 mass % or greater; preferably 60 mass % or less, more preferably 50 mass % or less, further preferably 40 mass % or less, and particularly 30 mass % or less. A numerical range of the concentration of $CeO_2$ is preferably 5 mass % or greater and 60 mass % or less, more preferably 10 mass % or greater and 50 mass % or less, further preferably 15 mass % or greater and 40 mass % or less, and particularly preferably 20 mass % or greater and 30 mass % or less. When the concentration of $CeO_2$ is 5 mass % or greater, the amount of the phosphorus compound adhering to the Rh decreases, and therefore, a reduction in catalyst performance can be suppressed. On the other hand, when the concentration of $CeO_2$ is 60 mass % or less, the phosphorus compound is less likely to adhere to $CeO_2$, and the reduction in catalyst performance can be suppressed.

Refractory Inorganic Oxide

Examples of the refractory inorganic oxide include alumina, lanthanum-containing alumina, zirconia, silica-alumina, titania, and zeolite, and they can be used alone or in form of a mixture of two or more kinds. The refractory inorganic oxide preferably exhibits a small change in specific surface area at a temperature of 700° C. or higher and preferably 1000° C. or higher. While the BET specific surface area of the refractory inorganic oxide is not particularly limited, from the perspective of supporting the catalyst active component, such as the noble metal, the BET specific surface area is preferably from 50 to 750 $m^2/g$ and more preferably from 150 to 750 $m^2/g$. While the average primary particle size of the refractory inorganic oxide is not particularly limited, the average primary particle size is preferably in a range from 5 nm to 20 nm and more preferably from 5 nm to 10 nm. Such a range allows supporting the noble metal on the refractory inorganic oxide. Note that, in the present specification, the shape or average primary particle size of the refractory inorganic oxide is measured by a transmission electron microscope (TEM).

The amount of the refractory inorganic oxide is preferably from 10 to 300 g, more preferably from 20 to 200 g, and further preferably from 50 to 100 g per liter of the refractory three-dimensional structure. The amount of refractory inorganic oxide within this range allows dispersing and supporting the catalyst component, such as the noble metal.

Co-Catalyst

As the co-catalyst, a group 1 element, a group 2 element, and/or a rare earth element can be added. Examples of the group 1 element, the group 2 element, and the rare earth element include potassium, magnesium, calcium, strontium, barium, and lanthanum, and they can be used alone or in a form of a mixture of two or more kinds. For example, an oxide, sulfate, carbonate, and nitrate of the group 1 element or the group 2 element are used as the raw material, and the raw material is contained in the catalyst in the form of an oxide, sulfate, or carbonate after calcining. Among these, the use of lanthanum oxide ($La_2O_3$), barium oxide (BaO), or barium sulfate ($BaSO_4$) is preferred, and each of the materials is preferably contained in an amount of 0 to 50 g, more preferably 0.5 to 30 g, and further preferably 1 to 20 g per liter of the refractory three-dimensional structure.

The catalyst according to the present invention can exhibit sufficient exhaust gas purification performance even after the catalyst is exposed to the phosphorus compound-containing exhaust gas at high temperature over a long period of time. The phosphorus compound is deposited as phosphorus oxide ($P_2O_5$) on the catalyst exposed to the exhaust gas containing the phosphorus compound. According to the present invention, excellent exhaust gas purification performance can be exhibited even in a state where the phosphorus compound is accumulated in an amount of 1 g to 50 g, more preferably 1 g to 30 g, further preferably 1 g to 15 g, and particularly preferably 1 g to 10 g per liter of the refractory three-dimensional structure. The phosphorus compound generally deposits more on the gas inflow side and less toward the gas outflow side. The phosphorus compound is present at a high concentration near the surface of the catalyst layer, and the phosphorus compound infiltrates further inside the catalyst layer (towards the direction of the refractory three-dimensional structure) the concentration decreases.

The amount of the phosphorus compound deposited on the catalyst can be analyzed using, for example, a fluorescence X-ray analysis (XRF), an electron probe microanalyzer (EPMA), and SEM-EDX. To examine the distribution throughout the catalyst in the exhaust gas flow direction, after the catalyst is cut at a predetermined length, the amount of phosphorus compound in each segment can be analyzed by, for example, XRF. The distribution can be examined by comparing the results of the analysis at the respective segments.

Method of Manufacturing Phosphorus Compound-Containing Exhaust Gas Purifying Catalyst The phosphorus compound-containing exhaust gas purifying catalyst can be easily manufactured by a person skilled in the art by appropriately referring to the known methods. The preferred manufacturing process includes a method involving the following steps. That is, a method of manufacturing the phosphorus compound-containing exhaust gas purifying catalyst according to another embodiment of the present invention includes: (I) a step of applying, drying, and calcining a slurry for the lower catalyst layer containing Pd continuously from the gas inflow side end surface to form the lower catalyst layer on the cell walls of the refractory three-dimensional structure, the three-dimensional structure being provided extending from the gas inflow side end surface to the gas outflow side end surface, the refractory three-dimensional structure having cell walls that define and form multiple gas flow paths running from the gas inflow side end surface to the gas outflow side end surface; and (II) after forming the lower catalyst layer, a step of applying a slurry for gas inflow side upper catalyst layer containing Rh continuously from the gas inflow side end surface and a slurry for gas outflow side catalyst layer containing Rh continuously from the gas outflow side end surface on the cell walls such that the slurries are not in contact with one another, subsequently drying and calcining the slurries to form the gas inflow side upper catalyst layer and the gas outflow side upper catalyst layer.

A slurry is prepared by mixing raw materials of the noble metal, the oxygen storage material, the refractory inorganic oxide, and the co-catalyst with an aqueous medium and performing wet milling on the resultant. Note that the slurry may be prepared in advance using the oxygen storage material or the refractory inorganic oxide that supports the noble metal or the co-catalyst. Examples of the aqueous medium include water, lower alcohols, such as ethanol and 2-propanol, and an organic alkaline aqueous solution. Water and the lower alcohol are preferably used, and in particular water is preferably used. The concentration of solids in the slurry is preferably from 5 to 60 mass %, and more preferably from 10 to 50 mass %. A known method can be appropriately used as the method for wet milling, and examples of the method include a method using a ball mill.

While a method of applying the slurry to the refractory three-dimensional structure is not particularly limited, examples of the method include a method of immersing the refractory three-dimensional structure in a container containing a slurry from the gas inflow side end surface or the gas outflow side end surface. At that time, the region to which the slurry is applied is controlled such that each catalyst layer has the desired length. Note that after applying, drying, and calcining the slurry for lower catalyst layer in Step (I), the slurry for gas inflow side upper catalyst layer and the slurry for gas outflow side upper catalyst layer are applied, dried, and calcined in Step (II). Here, in Step (II), after the slurry for gas inflow side upper catalyst layer and the slurry for gas outflow side upper catalyst layer are both applied (note that the order of the application of the slurries at this time is not particularly limited), both slurries may be dried and calcined together; either one of the slurries for gas inflow side upper catalyst layer and gas outflow side upper catalyst layer may be applied, dried, and calcined to form one catalyst layer, and then the other slurry may be applied, dried, and calcined to form the other catalyst layer.

As the drying and calcining conditions, it is only necessary that the catalyst component can adhere to the refractory three-dimensional structure, and the drying and calcining are not particularly limited. The drying is performed in air at a temperature preferably from 50 to 300° C. and more preferably from 80 to 200° C., and for a period preferably from 5 minutes to 10 hours and more preferably from 30 minutes to 8 hours. Next, the calcining is performed at a temperature preferably from 300 to 1200° C. and more preferably from 400 to 700° C., and for a period preferably from 10 minutes to 10 hours and more preferably from 30 minutes to 5 hours.

Method of Purifying Exhaust Gas

According to another one aspect of the present invention, the method of purifying the phosphorus compound-containing exhaust gas that includes a step of bringing the phosphorus compound-containing exhaust gas purifying catalyst in contact with the phosphorus compound-containing exhaust gas.

The phosphorus compound-containing exhaust gas is preferably discharged from the internal combustion engine. As the internal combustion engine, for example, a gasoline engine, a hybrid engine, and an engine using, for example, natural gas, ethanol, and dimethyl ether as a fuel can be used. Among these, a gasoline engine is preferred.

The temperature of the phosphorus compound-containing exhaust gas is preferably 0° C. to 800° C., that is, preferably within a temperature range of exhaust gas during normal operation. Here, the air-fuel ratio (A/F) of the exhaust gas in the internal combustion engine at the temperature from 0° C. to 800° C. is preferably 10 to 30 and more preferably 11 to 14.7.

The catalyst according to the present invention can exhibit sufficient exhaust gas purification performance even after being exposed to high temperature over a long period of time. Here, exposure to high temperature means exposure to exhaust gas at preferably 800° C. to 1200° C. Here, the air-fuel ratio (A/F) of the exhaust gas in the internal combustion engine at the temperature of 800° C. to 1200° C. is preferably from 10 to 18.6. The period of exposure to the exhaust gas at the temperature of 800° C. to 1200° C. is preferably from 5 to 500 hours.

To evaluate the exhaust gas purification performance after the exposure to the phosphorus compound-containing exhaust gas at high temperature for a long period of time, it is effective to examine the exhaust gas purification performance after carrying out thermal aging and phosphorus poisoning by exposing the catalyst to the phosphorus compound-containing exhaust gas at 800° C. to 1200° C. for from 5 to 500 hours.

In addition, the catalyst according to the present invention can effectively purify exhaust gas even at an exhaust gas space velocity of preferably 80000 $h^{-1}$ or greater, more preferably 100000 $h^{-1}$ or greater, and further preferably 120000 $h^{-1}$ or greater. While the upper limit of the space velocity of exhaust gas depends on the displacement of the engine, such as an internal combustion engine, 500000 $h^{-1}$ or less is preferred.

EXAMPLES

The present invention will be further specifically described below using examples and comparative examples, but the present invention is not limited to these following examples. Note that unless otherwise specified, each operation was performed under of room temperature conditions (25° C.)/relative humidity 40 to 50% RH. In addition, unless otherwise specified, a ratio represents a mass ratio.

Example 1: Production of Catalyst A

Palladium nitrate (Pd), a $CeO_2$—$ZrO_2$ composite oxide (45 mass % as $CeO_2$), an aluminum oxide ($Al_2O_3$), barium hydroxide, and lanthanum acetate were each weighed such that the mass ratio was 4.75:16.9:22.4:4.7:1.1 in terms of Pd:$CeO_2$—$ZrO_2$ composite oxide:$Al_2O_3$:barium oxide:lanthanum oxide, water was added, and wet milled to prepare a slurry a0.

As the refractory three-dimensional structure, a cordierite carrier with a diameter of 105.7 mm, a length of 80 mm, a cylindrical shape of 0.7-L, cylindrical 900 cells per square inch (1 inch=25.4 mm), a cell wall thickness of 2.5 mil (1 mil=0.0254 mm), and a square gas passage opening (cell shape) was used. The slurry a0 was applied up to a length of 30 mm from a gas inflow side end surface of the cordierite carrier and after drying at 150° C. for 15 minutes, it was calcined at 550° C. for 30 minutes, so that the supported amount after calcination was 51.8 g/L (36.3 g/pc) to provide a catalyst layer A0.

Next, rhodium nitrate (Rh), a $CeO_2$—$ZrO_2$ composite oxide (25 mass % as $CeO_2$), an aluminum oxide, and lanthanum oxide were each weighed such that the mass ratio was 0.591:13.1:14.3:2.6 in terms of Rh:$CeO_2$—$ZrO_2$ composite oxide:$Al_2O_3$:$La_2O_3$, water was added, and wet milled to prepare a slurry a1. The slurry a1 was applied up to a length of 30 mm from a gas inflow side end surface of the carrier where A0 was provided, and after drying at 150° C. for 15 minutes, it was calcined at 550° C. for 30 minutes, so that the supported amount after calcination was 30.7 g/L (21.5 g/pc) to provide a catalyst layer A1.

Subsequently, rhodium nitrate (Rh), a $CeO_2$—$ZrO_2$ composite oxide (25 mass % as $CeO_2$), an aluminum oxide, and lanthanum oxide were each weighed such that the mass ratio was 0.259:21.9:23.8:4.4 in terms of Rh:CeO$_2$—ZrO$_2$ composite oxide:Al$_2$O$_3$:La$_2$O$_3$, water was added, and wet milled to prepare a slurry a2. The slurry a2 was applied up to a length of 40 mm (the separation distance from the application region of the slurry a1 was 10 mm) from the gas outflow side end surface of the carrier where A1 was provided and after drying at 150° C. for 15 minutes, it was calcined at 550° C. for 30 minutes, so that the supported amount after calcination was 50.3 g/L (35.2 g/pc) to provide a catalyst layer A2. The catalyst A provided with the catalyst layers A0, A1, and A2 was thus obtained.

Note that the catalyst A has the same structure as the phosphorus compound-containing exhaust gas purifying catalyst 2 of FIG. 2 described in the second embodiment above. The structure of catalyst A will be described with reference to FIG. 2. The lower catalyst layer 120 is formed on the surface of the refractory three-dimensional structure 10 up to a length of 30 mm from the gas inflow side end surface 10A. The gas inflow side upper catalyst layer 30 is located on the uppermost layer on the cell wall and is formed continuously from the gas inflow side end surface 10A up to the length of 30 mm. The gas outflow side upper catalyst layer 140 is located on the uppermost layer on the cell wall and formed continuously from the gas outflow side end surface 10B to the length of 40 mm. The gas inflow side upper catalyst layer 30 and the gas outflow side upper catalyst layer 140 are disposed so as to be separated from one another by 10 mm along the gas flow path direction.

Example 2: Production of Catalyst B

The same raw materials as those of Example 1 were each weighed such that the mass ratio was 4.75:22.5:29.8:6.2:1.5 in terms of Pd:CeO$_2$—ZrO$_2$ composite oxide:Al$_2$O$_3$:barium oxide:lanthanum oxide, water was added, and wet milled to prepare a slurry b0.

The slurry b0 was applied up to a length of 40 mm from the gas inflow side end surface of the refractory three-dimensional structure to a cordierite carrier similar to Example 1, and dried and calcined similarly to Example 1, so that the supported amount after calcination was 67.2 g/L (47.0 g/pc) to provide a catalyst layer B0.

Next, the slurry a1 was applied up to a length of 30 mm from the gas inflow side end surface of the carrier where B0 was provided, and dried and calcined similarly to Example 1, so that the supported amount after calcination was 30.7 g/L (21.5 g/pc) to provide a catalyst layer B1.

Subsequently, the slurry a2 was applied up to a length of 40 mm (the separation distance from the application region of the slurry a1 was 10 mm) from the gas outflow side end surface of the carrier where B1 was provided and dried and calcined similarly to Example 1, so that the supported amount after calcination was 50.3 g/L/35.2 g/pc) to provide a catalyst layer B2. The catalyst B provided with the catalyst layers B0, B1, and B2 was thus obtained.

Note that the catalyst B has the same structure as the phosphorus compound-containing exhaust gas purifying catalyst 3 of FIG. 3 described in the second embodiment above. The structure of catalyst B will be described with reference to FIG. 3. The lower catalyst layer 120 is formed on the surface of the refractory three-dimensional structure 10 up to a length of 40 mm from the gas inflow side end surface 10A. The gas inflow side upper catalyst layer 30 is located on the uppermost layer on the cell wall and is formed continuously from the gas inflow side end surface 10A up to the length of 30 mm. The gas outflow side upper catalyst layer 140 is located on the uppermost layer on the cell wall and formed continuously from the gas outflow side end surface 10B up to the length of 40 mm, and the end on the gas inflow side is disposed so as to contact the gas outflow side end of the lower catalyst layer 120. The gas inflow side upper catalyst layer 30 and the gas outflow side upper catalyst layer 140 are disposed so as to be separated from one another by 10 mm along the gas flow path direction.

Example 3: Production of Catalyst C

The same raw materials as those of Example 1 were each weighed such that the mass ratio was 4.75:28.1:37.3:7.8:1.9 in terms of Pd:CeO$_2$—ZrO$_2$ composite oxide:Al$_2$O$_3$:barium oxide:lanthanum oxide, water was added, and wet milled to prepare a slurry c0.

The slurry c0 was applied up to a length of 50 mm from the gas inflow side end surface of the refractory three-dimensional structure, and dried and calcined similarly to Example 1, so that the supported amount after calcination was 82.7 g/L (57.9 g/pc) to provide a catalyst layer C0.

Next, the slurry a1 was applied up to a length of 30 mm from the gas inflow side end surface of the carrier where C0 was provided to a cordierite carrier similar to Example 1, and dried and calcined similarly to Example 1, so that the supported amount after calcination was 30.7 g/L (21.5 g/pc) to provide a catalyst layer C1.

Subsequently, the slurry a2 was applied up to a length of 40 mm (the separation distance from the application region of the slurry a1 was 10 mm) from the gas outflow side end surface of the carrier where C1 was provided, and dried and calcined similarly to Example 1, so that the supported amount after calcination was 50.3 g/L (35.2 g/pc) to provide a catalyst layer C2. The catalyst C provided with the catalyst layers C0, C1, and C2 was thus obtained.

Note that catalyst C has the same structure as the phosphorus compound-containing exhaust gas purifying catalyst 1 of FIG. 1 described in the first embodiment above. The structure of catalyst C will be described with reference to FIG. 1. The lower catalyst layer 20 is formed on the surface of the refractory three-dimensional structure 10 up to a length of 50 mm from the gas inflow side end surface 10A. The gas inflow side upper catalyst layer 30 is located on the uppermost layer on the cell wall and formed continuously from the gas inflow side end surface 10A up to the length of 30 mm. The gas outflow side upper catalyst layer 40 is located on the uppermost layer on the cell wall and formed continuously from the gas outflow side end surface 10B up to the length of 40 mm. The gas inflow side end of the gas outflow side upper catalyst layer 40 is formed on the surface of the lower catalyst layer 20, and the gas outflow side end of the gas outflow side upper catalyst layer 40 is formed on the surface of the refractory three-dimensional structure 10. The gas inflow side upper catalyst layer 30 and the gas outflow side upper catalyst layer 140 are disposed so as to be separated from one another by 10 mm along the gas flow path direction.

Example 4: Production of Catalyst D

The same raw materials as those of Example 1 were each weighed such that the mass ratio was 4.75:33.8:44.7:9.3:2.3 in terms of Pd:CeO$_2$—ZrO$_2$ composite oxide:Al$_2$O$_3$:barium oxide:lanthanum oxide, water was added, and wet milled to prepare a slurry d0.

The slurry d0 was applied up to a length of 60 mm from the gas inflow side end surface of the refractory three-dimensional structure to the cordierite carrier similar to Example 1 and dried and calcined similarly to Example 1, so that the supported amount after calcination was 98.1 g/L (68.7 g/pc), to provide a catalyst layer D0.

Next, the slurry a1 was applied up to a length of 30 mm from the gas inflow side end surface of the carrier where D0 was provided, and dried and calcined similarly to Example 1, so that the supported amount after calcination was 30.7 g/L (21.5 g/pc), to provide a catalyst layer D1.

Subsequently, the slurry a2 was applied up to a length of 40 mm (the separation distance from the application region of the slurry a1 was 10 mm) from the gas outflow side end surface of the carrier where D1 was provided, and dried and calcined similarly to Example 1, so that the supported amount after calcination was 50.3 g/L (35.2 g/pc), to provide a catalyst layer D2. The catalyst D provided with the catalyst layers D0, D1, and D2 was thus obtained.

Note that with the exception that the lower catalyst layer is formed up to the length of 60 mm from the gas inflow side end surface, catalyst D has the same structure as catalyst C of Example 3.

Comparative Example 1: Production of Catalyst E

The same raw materials as those of Example 1 were each weighed such that the mass ratio was 4.75:45:59.6:12.4:3 in terms of Pd:CeO$_2$—ZrO$_2$ composite oxide:Al$_2$O$_3$:barium oxide:lanthanum oxide, water was added, and wet milled to prepare a slurry e0.

The slurry e0 was applied up to a length of 80 mm (up to the gas outflow side end surface) from the gas inflow side end surface of the refractory three-dimensional structure to the cordierite carrier similar to Example 1 and dried and calcined similarly to Example 1, so that the supported amount after calcination was 129.0 g/L (90.3 g/pc), to provide a catalyst layer E0.

Next, the slurry a1 was applied up to a length of 30 mm from the gas inflow side end surface of the carrier where E0 was provided, and dried and calcined similarly to Example 1, so that the supported amount after calcination was 30.7 g/L (21.5 g/pc), to provide a catalyst layer E1.

Next, the slurry a2 was applied up to a length of 40 mm (a separation distance from the application region of the slurry a1 became 10 mm) from the gas outflow side end surface of the carrier where E1 was provided, and dried and calcined similarly to Example 1, so that the supported amount after calcination was 50.3 g/L (35.2 g/pc) to provide a catalyst layer E2. The catalyst E provided with the catalyst layers E0, E1, and E2 was thus obtained.

Figure 4:
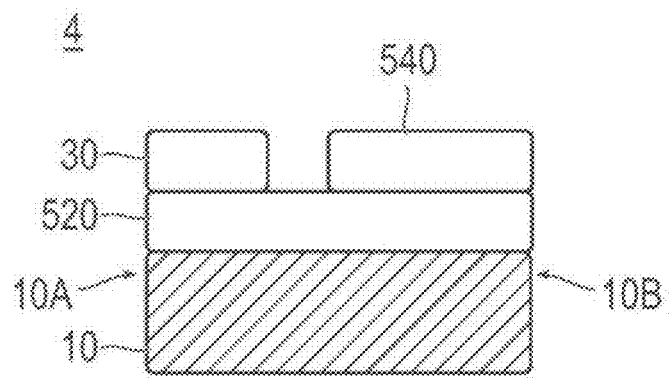
FIG. 4 is a cross-sectional view illustrating a phosphorus compound-containing exhaust gas purifying catalyst according to Comparative Example 1.

The structure of catalyst E is described with reference to FIG. 4. Catalyst E differs from catalysts A to D in the structure of the lower catalyst layer as illustrated in FIG. 4. The lower catalyst layer 520 is formed on the entire surface of the refractory three-dimensional structure 10 from the gas inflow side end surface 10A to the gas outflow side end surface 10B. The gas inflow side upper catalyst layer 30 is located on the uppermost layer on the cell wall and formed continuously from the gas inflow side end surface 10A up to a length of 30 mm. The gas outflow side upper catalyst layer 540 is located on the uppermost layer on the cell wall and formed continuously from the gas outflow side end surface 10B up to the length of 40 mm. The gas outflow side upper catalyst layer 540 is formed entirely on the surface of the lower catalyst layer 520. The gas inflow side upper catalyst layer 30 and the gas outflow side upper catalyst layer 540 are disposed so as to be separated from one another by 10 mm along the gas flow path direction.

Comparative Example 2: Production of Catalyst F

In the same manner as Comparative Example 1, the catalyst layer E0 was provided on the cordierite carrier similar to Example 1.

Rhodium nitrate (Rh), a CeO$_2$—ZrO$_2$ composite oxide (25 mass % as CeO$_2$), an aluminum oxide, and lanthanum oxide were each weighed such that the mass ratio was 0.85:35:38:7 in terms of Rh:CeO$_2$—ZrO$_2$ composite oxide: Al$_2$O$_3$:La$_2$O$_3$, water was added, and wet milled to prepare a slurry f1.

Next, the slurry f1 was applied up to a length of 80 mm (up to the gas outflow side end surface) from the gas inflow side end surface of the carrier where E0 was provided to the cordierite carrier similar to Example 1, and dried and calcined similarly to Example 1, so that the supported amount after calcination was 81.1 g/L (56.8 g/pc), to provide a catalyst layer F1. The catalyst F provided with the catalyst layers E0 and F1 was thus obtained.

Figure 5:
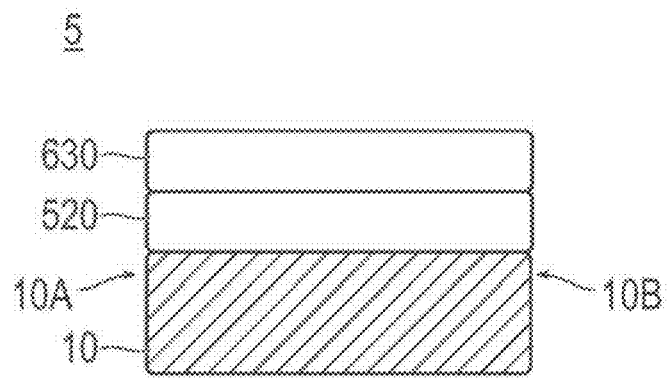
FIG. 5 is a cross-sectional view illustrating a phosphorus compound-containing exhaust gas purifying catalyst according to Comparative Example 2.

The structure of catalyst F is described with reference to FIG. 5. Catalyst F differs from catalysts A to D in the structure of the lower and upper catalyst layers as illustrated in FIG. 5. Similar to catalyst E, the lower catalyst layer 520 is formed on the entire surface of the refractory three-dimensional structure 10 from the gas inflow side end surface 10A to the gas outflow side end surface 10B. The upper catalyst layer 630 is formed on the entire surface of the lower catalyst layer 520 from the gas inflow side end surface 10A to the gas outflow side end surface 10B.

Comparative Example 3: Production of Catalyst G

Palladium nitrate (Pd), rhodium nitrate (Rh), a CeO$_2$—ZrO$_2$ composite oxide (45 mass % as CeO$_2$), an aluminum oxide (Al$_2$O$_3$), barium hydroxide, and lanthanum acetate were each weighed such that the mass ratio was 4.75:0.591:13.1:14.3:2.6 in terms of Pd:Rh:CeO$_2$—ZrO$_2$ composite oxide:Al$_2$O$_3$:lanthanum oxide, water was added, and wet milled to prepare a slurry g0.

The slurry g0 was applied up to a length of 30 mm from the gas inflow side end surface of the refractory three-dimensional structure to the cordierite carrier similar to Example 1, and dried and calcined similarly to Example 1, so that the supported amount after calcination was 36.2 g/L (25.3 g/pc), to provide a catalyst layer G0.

Next, the slurry a2 was applied up to a length of 40 mm (the separation distance from the application region of the slurry g0 was 10 mm) from the gas outflow side end surface of the carrier where G0 was provided, and dried and calcined similarly to Example 1, so that the supported amount after calcination was 50.3 g/L (35.2 g/pc), to provide a catalyst layer G1. The catalyst G provided with the catalyst layers G0 and G1 was thus obtained.

Figure 6:
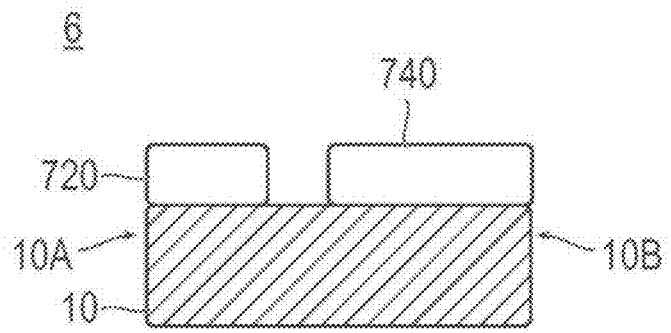
FIG. 6 is a cross-sectional view illustrating a phosphorus compound-containing exhaust gas purifying catalyst according to Comparative Example 3.

The structure of catalyst G is described with reference to FIG. 6. Catalyst G differs from catalysts A to D in that, as illustrated in FIG. 6, no lower catalyst layer is provided. The gas inflow side catalyst layer 720 is located on the uppermost layer of the refractory three-dimensional structure 10 and formed continuously from the gas inflow side end surface 10A up to the length of 30 mm. The gas outflow side catalyst layer 740 is located on the uppermost layer of the refractory three-dimensional structure 10 and formed continuously from the gas outflow side end surface 10B up to the length of 40 mm. The gas inflow side catalyst layer 720 and the gas outflow side catalyst layer 740 are disposed so as to be separated from one another by 10 mm along the gas flow path direction.

Thermal Aging and Phosphorus Poisoning

Catalysts A to G obtained above were each installed 25 cm of the exhaust port of a V-type 8-cylinder, 5.6-liter engine. Engine oil with a phosphorus (P) concentration of 6 ppm was used. The engine was operated at an air-fuel ratio (A/F) at the catalyst inlet of 14.6 and a catalyst bed temperature of 1000° C. and then was operated at an A/F of 12.5, subsequently fuel supply was stopped, and this engine operation cycle was repeated for 100 hours, thus thermal aging was carried out.

Next, each thermally aged catalyst was installed downstream of an exhaust port of a 3.0 L-engine. Engine Oil with a phosphorus (P) concentration of 3000 ppm was used. The phosphorus poisoning was carried out by operation at a catalyst bed temperature of 880° C. The phosphorus content of each catalyst after the phosphorus poisoning treatment was analyzed by X-ray fluorescence (XRF). It was confirmed that about 2 g of phosphorus compound in terms of phosphorus oxide ($P_2O_5$) per liter of the refractory three-dimensional structure were contained therein.

Performance Evaluation of Exhaust Gas Purifying Catalyst 1

Figure 7A:
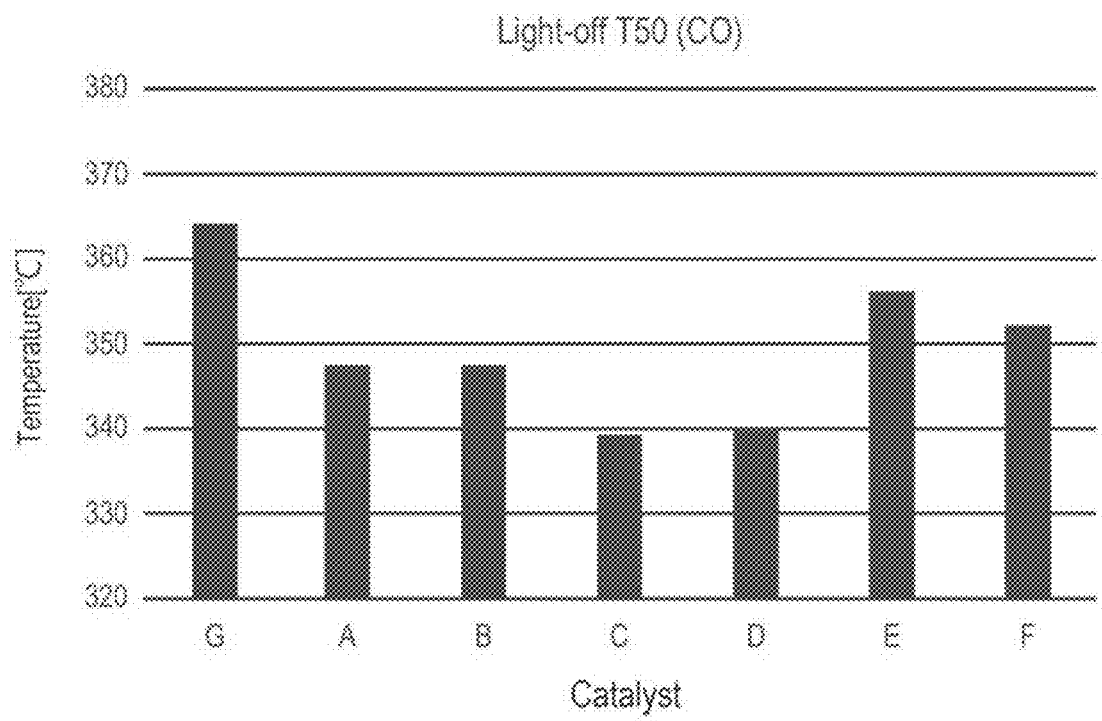
FIG. 7A is a graph illustrating temperatures at which CO purification rates of catalysts according to examples and the comparative examples of the present invention reach 50%.
Figure 7B:
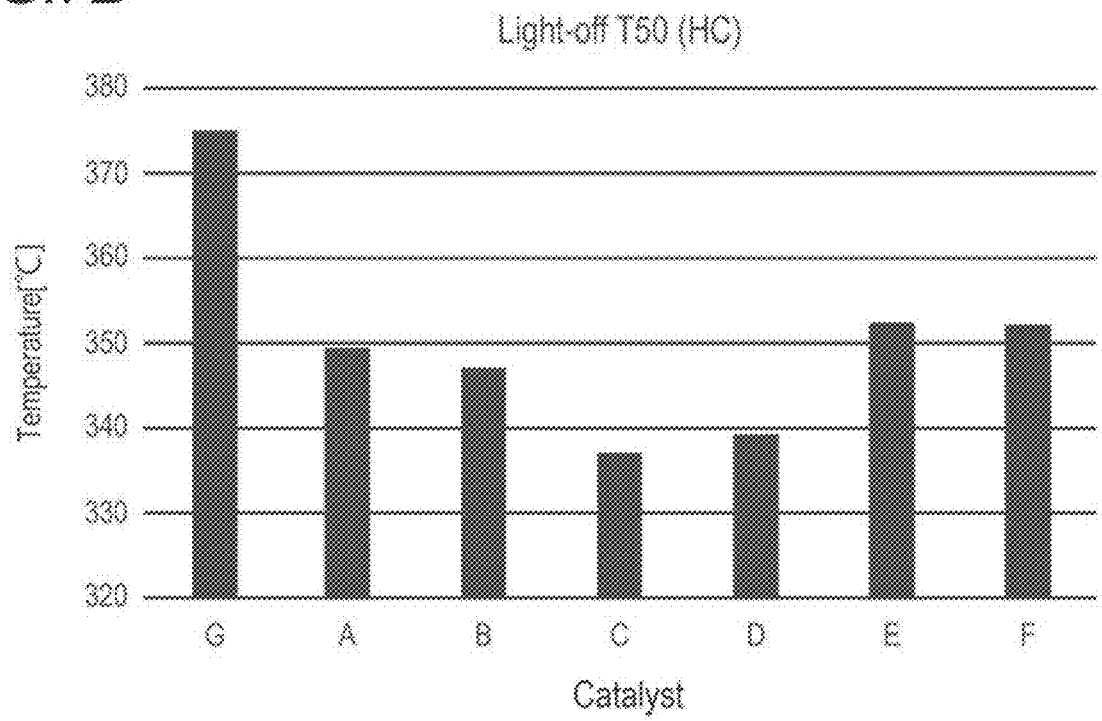
FIG. 7B is a graph illustrating temperatures at which HC purification rates of the catalysts according to the examples and the comparative examples of the present invention reach 50%.

After phosphorus poisoning catalysts A to G were each installed 30 cm downstream of the exhaust port of a straight-six, 2-liter engine. The gas temperature 15 cm from the gas inflow side end surface was raised from 150° C. to 500° C. at 50° C./minute at an A/F of 14.6. Engine oil with a phosphorus (P) concentration of 6 ppm was used. At this time, the space velocity for each catalyst was $150000^{-1}$. Gas discharged from the catalyst outlet was sampled, and the purification ratios of each CO, HC, and NOx were calculated. FIGS. 7A to 7C illustrate temperatures (Light-off T50) at which the respective purification ratios reached 50%. The lower T50 is, the higher the exhaust gas purification performance.

Performance Evaluation of Exhaust Gas Purifying Catalyst 2

Figure 8A:
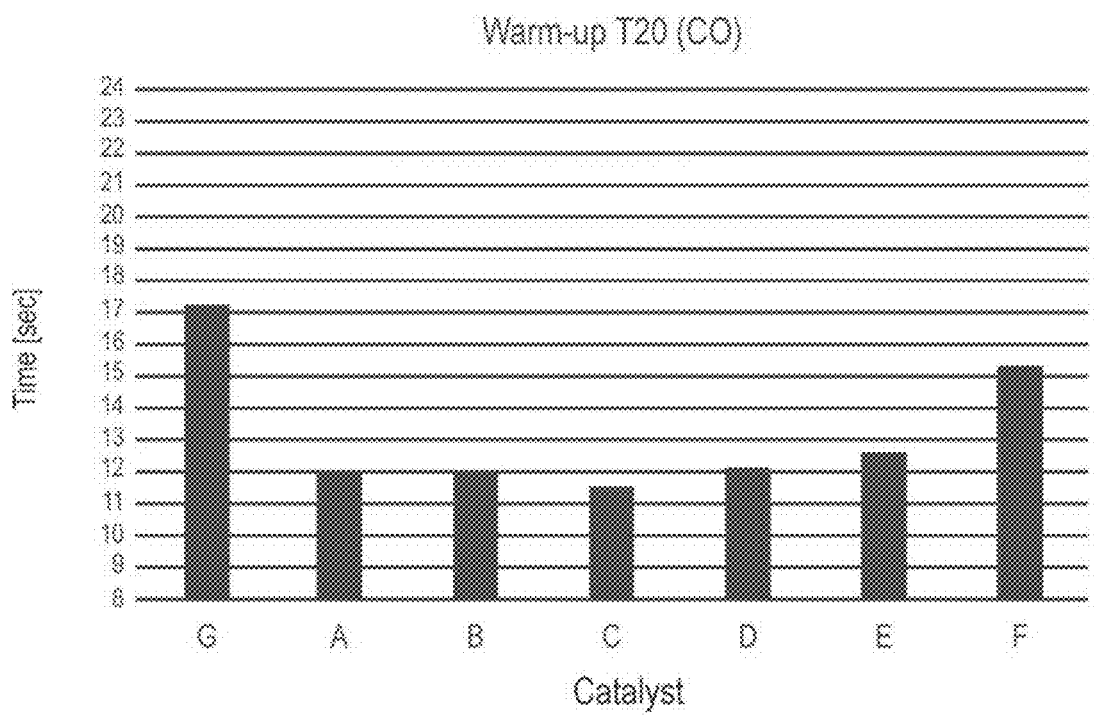
FIG. 8A is a graph illustrating times at which the CO purification rates of the catalysts according to the examples and the comparative examples of the present invention reach 20%.
Figure 8B:
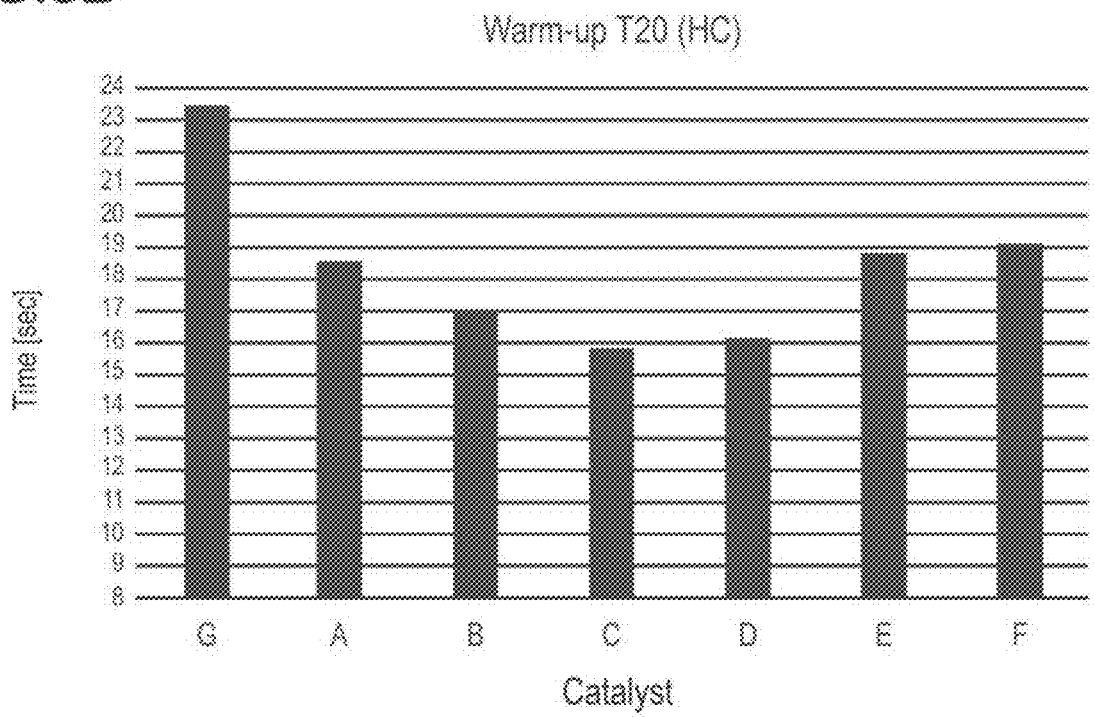
FIG. 8B is a graph illustrating times at which the HC purification rates of the catalysts according to the examples and the comparative examples of the present invention reach 20%.
Figure 8C:
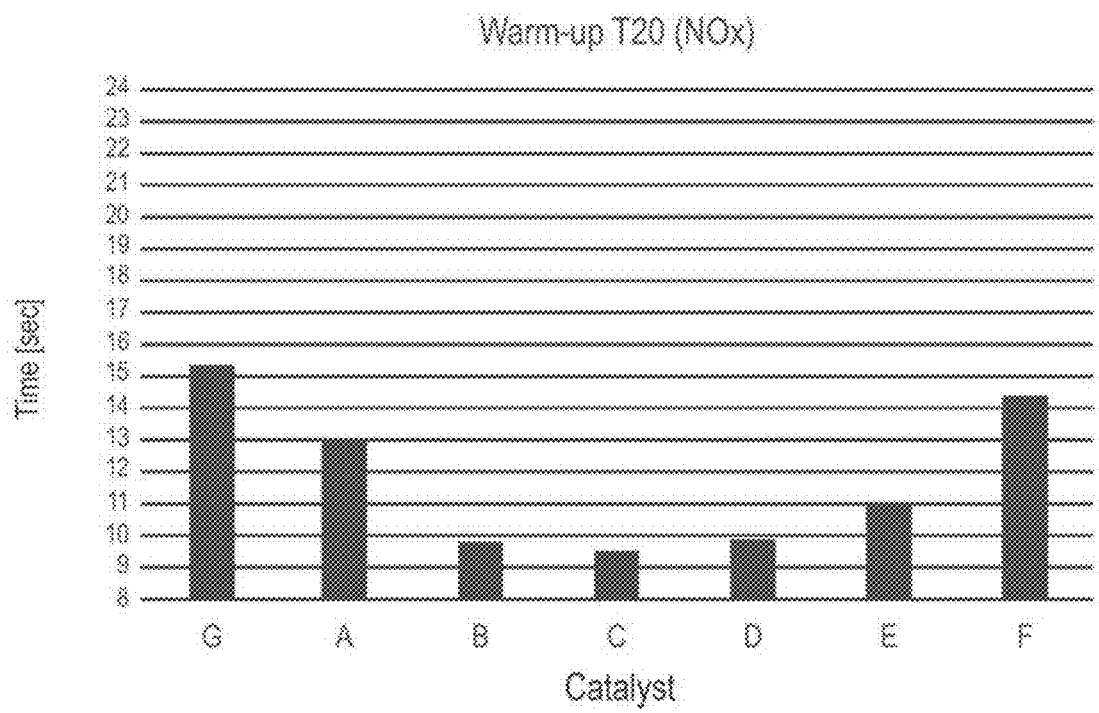
FIG. 8C is a graph illustrating times at which the NOx purification rates of the catalysts according to the examples and the comparative examples of the present invention reach 20%.
Figure 9A:
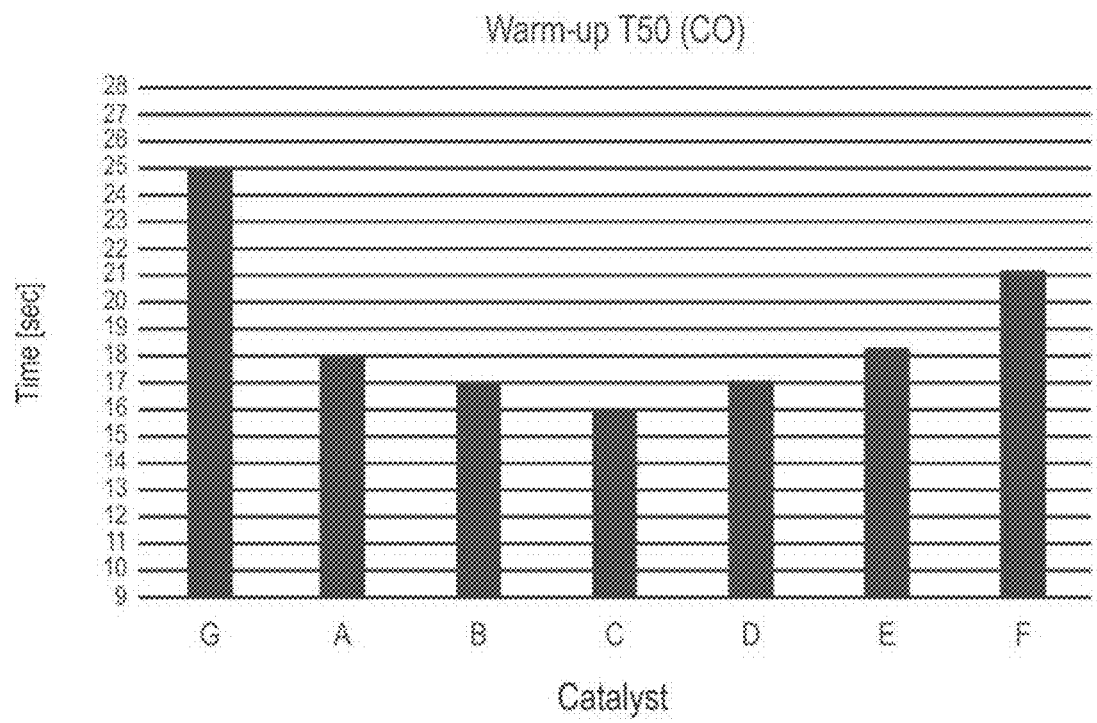
FIG. 9A is a graph illustrating times at which the CO purification rates of the catalysts according to the examples and the comparative examples of the present invention reach 50%.
Figure 9B:
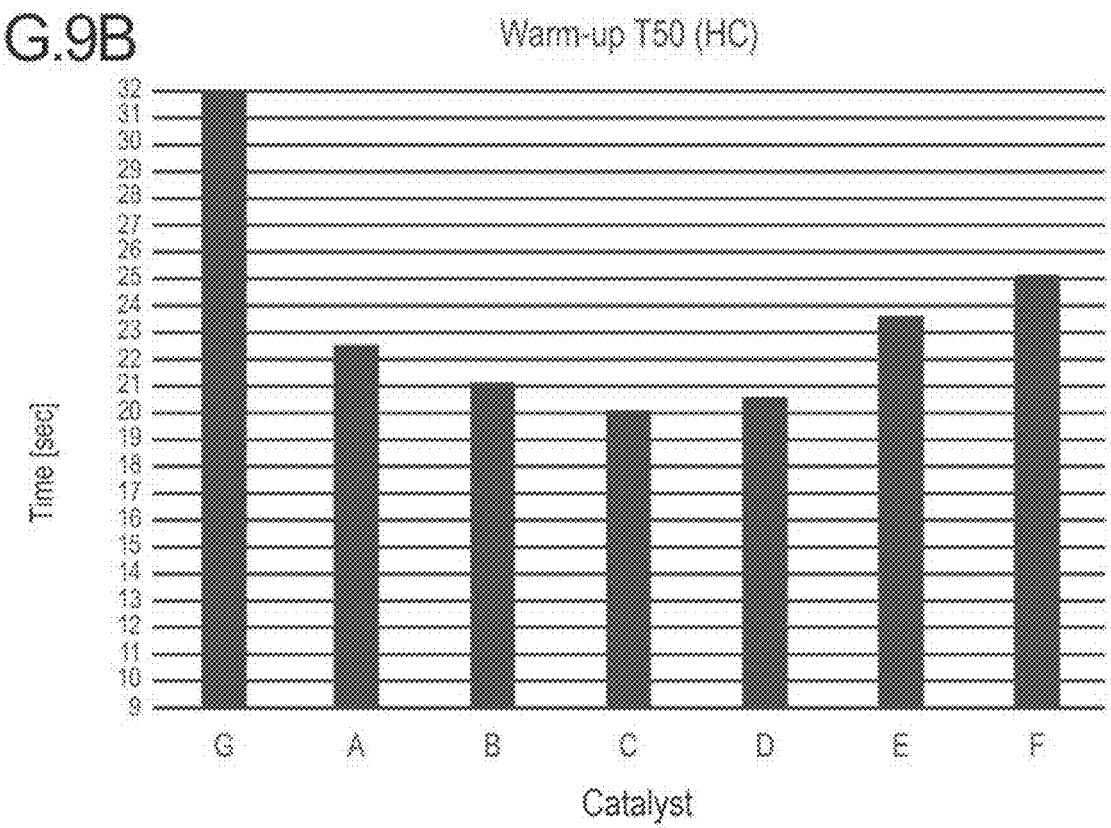
FIG. 9B is a graph illustrating times at which the HC purification rates of the catalysts according to the examples and the comparative examples of the present invention reach 50%.
Figure 9C:
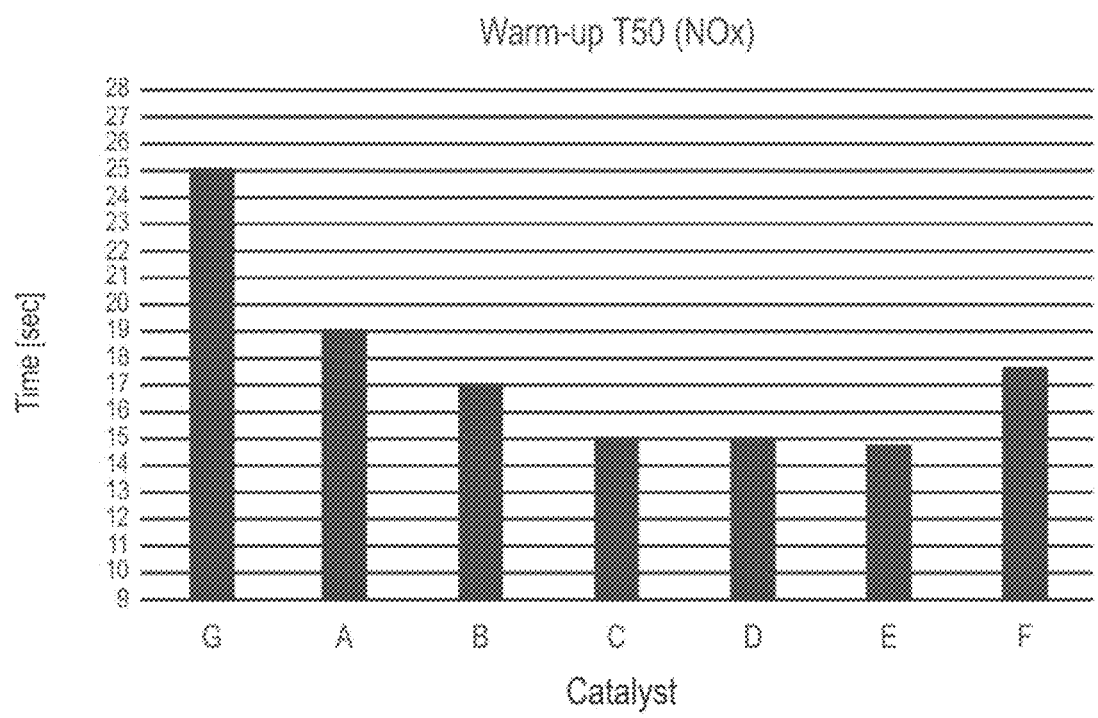
FIG. 9C is a graph illustrating times at which the NOx purification rates of the catalysts according to the examples and the comparative examples of the present invention reach 50%.

Catalysts A to G after phosphorus poisoning were each installed 30 cm downstream of the exhaust port of a straight-six, 2-liter engine. The catalyst inlet gas temperature was raised from 100° C. to 500° C. by 1800° C./minute at an A/F of 14.6. Engine oil with a phosphorus (P) concentration of 6 ppm was used. At this time, the space velocity for each catalyst was $140000^{-1}$. Gas discharged from the catalyst outlet was sampled, and the purification ratios of each CO, HC, and NOx were calculated. FIGS. 8A to 8C illustrate the time until each purification ratio reached 20% (Warm-up T20), and FIGS. 9A to 9C illustrate a time until each purification ratio reaches 50% (Warm-up T50). A shorter time to reach T20 or T50 means that the exhaust gas is purified earlier.

The results of FIGS. 7A to 7C, 8A to 8C, and 9A to 9C suggested that the catalyst according to the present invention exhibited excellent exhaust gas purification performance. In particular, catalysts C and D according to the first embodiment reach purification ratios of 50% (Light-off T50) at temperatures which are significantly lower than those of catalysts A and B according to the second embodiment. Additionally, in catalysts C and D, the amount of time required until the purification ratios reach 20% and 50% (Warm-up T20 and Warm-up T50) are significantly lower than those of catalysts A and B. This suggests that these catalysts exhibit excellent exhaust gas purification performance. It was speculated that this occurred because the formation of the recessed portion in the stepped shape on the gas outflow side of the gas outflow side upper catalyst layer suppresses phosphorus poisoning and maintains catalytic activity.

The present application is based on Japanese Patent Application No. 2017-254113, filed on Dec. 28, 2017, the disclosure of which is incorporated by reference in its entirety.

DESCRIPTION OF REFERENCE NUMERALS

1, 2, 3, 4, 5, 6 Phosphorus compound-containing exhaust gas purifying catalyst
10 Refractory three-dimensional structure
10A Gas inflow side end surface
10B Gas outflow side end surface
20, 120, 520 Lower catalyst layer
30 Gas inflow side upper catalyst layer
40, 140, 540 Gas outflow side upper catalyst layer
41 Step portion
50 Recessed portion
630 Upper catalyst layer
720 Gas inflow side catalyst layer
740 Gas outflow side catalyst layer

The invention claimed is:

1. A phosphorus compound-containing exhaust gas purifying catalyst, comprising:
    a refractory three-dimensional structure extending from a gas inflow side end surface to a gas outflow side end surface, the refractory three-dimensional structure having cell walls that define and form multiple gas flow paths, the gas flow paths running from the gas inflow side end surface to the gas outflow side end surface;
    a lower catalyst layer that contains Pd and is formed continuously from the gas inflow side end surface on the cell walls;
    a gas inflow side upper catalyst layer that contains Rh and is located on an uppermost layer on the cell walls, the gas inflow side upper catalyst layer being formed continuously from the gas inflow side end surface; and
    a gas outflow side upper catalyst layer that contains Rh and is located on an uppermost layer on the cell walls, the gas outflow side upper catalyst layer being formed continuously from the gas outflow side end surface, wherein
    the gas inflow side upper catalyst layer and the gas outflow side upper catalyst layer are disposed so as to be separated from one another along the gas flow path direction, and
    the lower catalyst layer has a length along the gas flow path direction of 15 mm or more, and a length ratio is 18% or more and less than 100% of the total length of the gas flow paths.

2. The phosphorus compound-containing exhaust gas purifying catalyst according to claim 1, wherein
    a total thickness of the catalyst layers at a gas inflow side end of the gas outflow side upper catalyst layer is greater than a total thickness of the catalyst layers at a gas outflow side end of the gas outflow side upper catalyst layer.

3. The phosphorus compound-containing exhaust gas purifying catalyst according to claim 1, wherein
    a separation distance between the gas inflow side upper catalyst layer and the gas outflow side upper catalyst layer is 5 mm or more and 30 mm or less.

4. The phosphorus compound-containing exhaust gas purifying catalyst according to claim 1, wherein
the gas inflow side upper catalyst layer has a length along the gas flow path direction of 10 mm or greater, and a length ratio is 12% or greater and 57% or less to the total length of the gas flow paths.

5. The phosphorus compound-containing exhaust gas purifying catalyst according to claim 1, wherein
the gas outflow side upper catalyst layer has a length along the gas flow path direction of 25 mm or greater, and a length ratios is 31% or greater and less than 88% to the total length of the gas flow paths.

6. The phosphorus compound-containing exhaust gas purifying catalyst according to claim 1, wherein
the gas inflow side upper catalyst layer has a length along the gas flow path direction equal to or less than the length of the lower catalyst layer.

7. The phosphorus compound-containing exhaust gas purifying catalyst according to claim 1, wherein
the gas inflow side upper catalyst layer has a higher Rh concentration than the Rh concentration of the gas outflow side upper catalyst layer.

8. The phosphorus compound-containing exhaust gas purifying catalyst according to claim 1, wherein
the lower catalyst layer has a lower Rh concentration than the gas outflow side upper catalyst layer.

9. The phosphorus compound-containing exhaust gas purifying catalyst according to claim 1, wherein
at least one layer among the lower catalyst layer, the gas inflow side upper catalyst layer, and the gas outflow side upper catalyst layer contains a composite oxide containing $CeO_2$ and $ZrO_2$.

10. The phosphorus compound-containing exhaust gas purifying catalyst according to claim 1, wherein
the refractory three-dimensional structure has a length in the gas flow path direction of greater than 15 mm and 1000 mm or less.

11. A method of manufacturing the phosphorus compound-containing exhaust gas purifying catalyst according to claim 1, comprising:
applying, drying, and calcining a slurry for the lower catalyst layer containing Pd continuously from the gas inflow side end surface to form the lower catalyst layer on the cell walls of the refractory three-dimensional structure, the three-dimensional structure extending along the gas inflow side end surface to the gas outflow side end surface, the refractory three-dimensional structure having the cell walls that define and form multiple gas flow paths running from the gas inflow side end surface to the gas outflow side end surface; and
after forming the lower catalyst layer, applying a slurry for the gas inflow side upper catalyst layer containing Rh continuously from the gas inflow side end surface and a slurry for gas outflow side catalyst layer containing Rh continuously from the gas outflow side end surface on the cell walls such that the slurries do not contact one another, subsequently drying and calcining the slurries to form the gas inflow side upper catalyst layer and the gas outflow side upper catalyst layer.

12. A method of purifying phosphorus compound-containing exhaust gas comprising
bringing the phosphorus compound-containing exhaust gas purifying catalyst according claim 1 into contact with phosphorus compound-containing exhaust gas.

* * * * *